July 10, 1934.  H. H. HAGLUND  1,966,386
METHOD AND MEANS OF TRANSPOSING SIGNALS FROM ONE CODE TO ANOTHER
Filed Aug. 13, 1932    3 Sheets-Sheet 1
FIG. 1     FIG. 2
FIG. 6
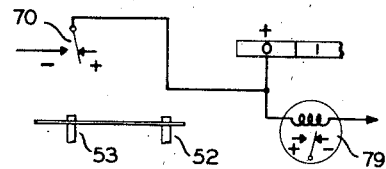
FIG. 7
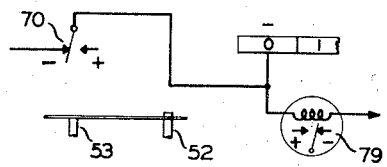
FIG. 5
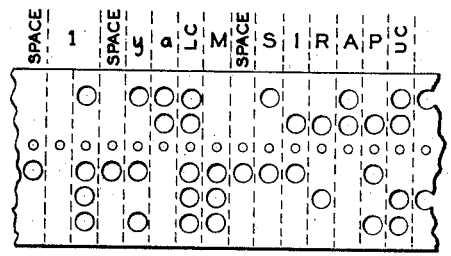
INVENTOR
H. H. HAGLUND
ATTORNEY July 10, 1934.     H. H. HAGLUND     1,966,386
METHOD AND MEANS OF TRANSPOSING SIGNALS FROM ONE CODE TO ANOTHER
Filed Aug. 13, 1932    3 Sheets-Sheet 2

INVENTOR
H. H. HAGLUND
ATTORNEY

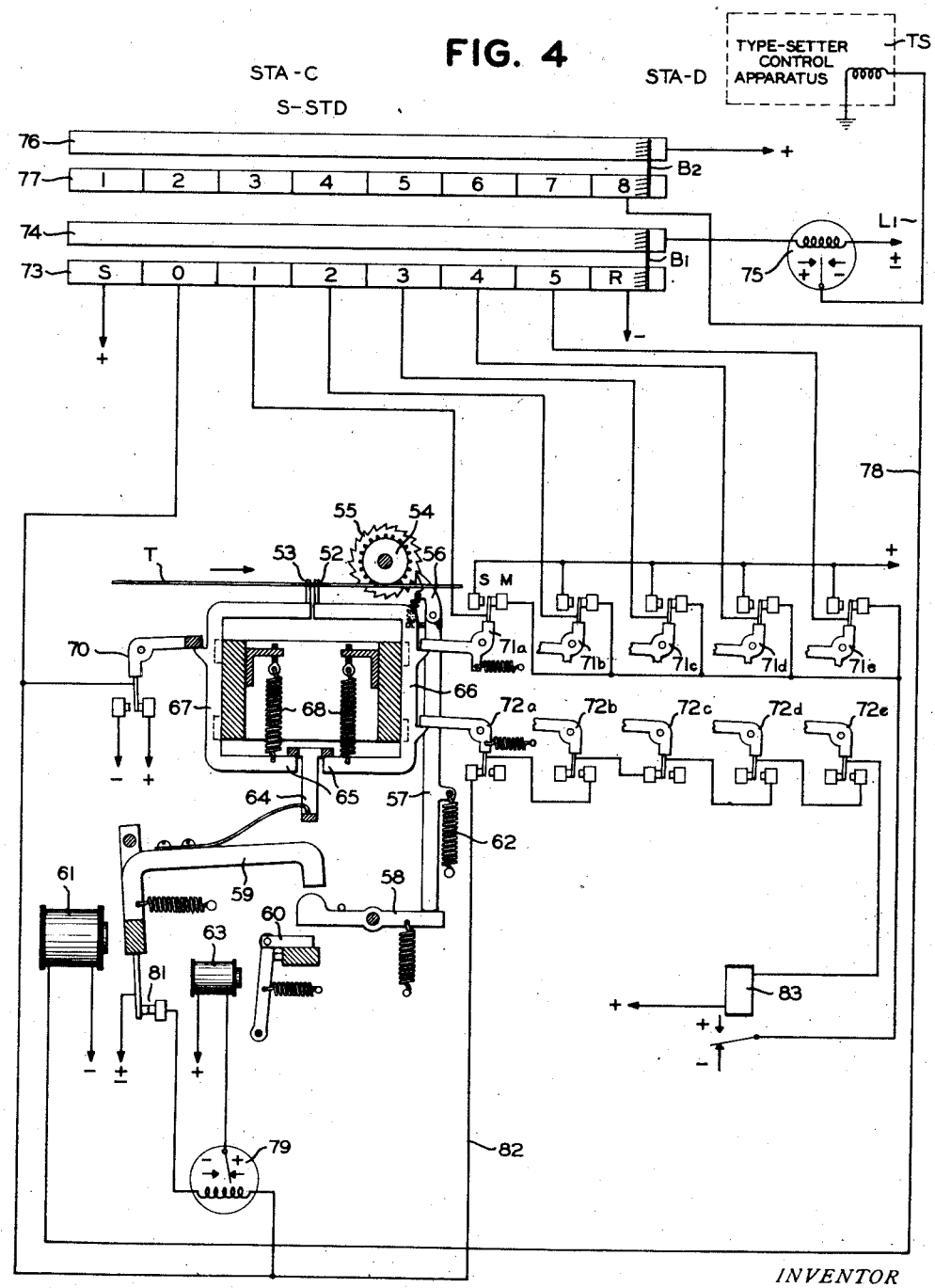

Patented July 10, 1934

1,966,386

UNITED STATES PATENT OFFICE 1,966,386

METHOD AND MEANS OF TRANSPOSING SIGNALS FROM ONE CODE TO ANOTHER

Hakon H. Haglund, New York, N. Y., assignor to The Western Union Telegraph Company, New York, N. Y., a corporation of New York Application August 13, 1932, Serial No. 628,750

30 Claims. (Cl. 178—3)

This invention relates to a code translator and more particularly to the translation of signals from one permutation code to another.

The invention is described with reference to a code translator for use in transposing a six-unit permutation code into a five-unit code and vice versa, but is generally applicable to changing from a code having any specified number of units into one having either a larger or a smaller number of units. It renders possible the transmission of the selecting conditions employed in a six-unit code for the telegraphic control of type-casting machines over a regular multiplex channel which is restricted to five unit signal groups.

Type-casting machines employ a large number of characters and symbols, a hundred or more, and consequently in the remote control of such machines this number of selecting conditions must be transmitted over the line wires. The usual circuits extending between remote cities are of the multiplex type and are universally adapted for a five-unit code only. The five-unit code permits of only thrity-two distinct combinations. By employing two of these combinations for shifting to and unshifting from the upper case position, approximately twice this number of selections can be procured. This is still far short of the number of selections necessary for the control of type casting machines, however, and therefore it has been proposed to employ a six-unit code in order to obtain the required number of selections. The six-unit code permits of sixty-four primary combinations and by the use of the upper case and the lower case shift combinations, the number of possible selections can be increased sufficiently to cover the entire keyboard of the type setter.

The six-unit code, cannot be transmitted, as such, over the ordinary multiplex circuits however, and therefore, it becomes one of the objects of the presents invention to provide a method of and means for transmitting equivalent selecting conditions, for the control of type setting machines, over a regular five-unit multiplex channel.

Another object is to provide means for transposing six-unit code signals or selecting conditions into five-unit code signals.

A more general object is to enable a telegraph code consisting of any definite number of units to be changed into one having a lesser number of units.

A still further object is to translate a special five-unit code into a regular six-unit code.

Other objects and advantages of the invention will appear as the description proceeds.

In accordance with a preferred embodiment of the present invention, six-unit code signals received over a line, as from a patron's office, are recorded at a central telegraph office, preferably on a tape, in the form of five-unit signals. The five-unit code may then be transmitted over any desired number of multiplex channels to remote points and from there retransposed into the original six-unit code and transmitted to the receiving subscriber where they may be used for controlling the operation of a type-setting machine.

The invention is based on the use of a definite code combination, in the five-unit code, either following or preceding each combination, which in the six-unit code employs a marking condition in a specific position in the code. For instance, in the six-unit code, the sixth unit is marking in approximately half of the combinations used. By separating this unit from the remainder of the code and representing it by a special five-unit code combination either preceding or following the five-unit combination representative of the remainder of the signal, it is possible to transpose from one code to the other and obtain all of the required combinations in the five-unit code.

The invention will be best understood by reference to the accompanying drawings in which:

Fig. 1 illustrates the six-unit code proposed for controlling type-casting machines from a distance.

Fig. 2 illustrates the corresponding five-unit code having an equal number of selecting conditions.

Fig. 4 is a diagrammatic view of a tape transmitter arranged to operate on a five-unit code of the type produced by the perforator in Fig. 3 and to transmit therefrom a six-unit code.

Fig. 5 shows a section of a five-unit perforated tape illustrating a number of combinations occurring in sequence.

Fig. 6 is a diagrammatic view of the controlling contacts of the tape transmitter when a particular set of successive combinations occur in the tape, and Fig. 7 is a similar view with another possible combination of character code groups in the transmitter.

Figure 3:
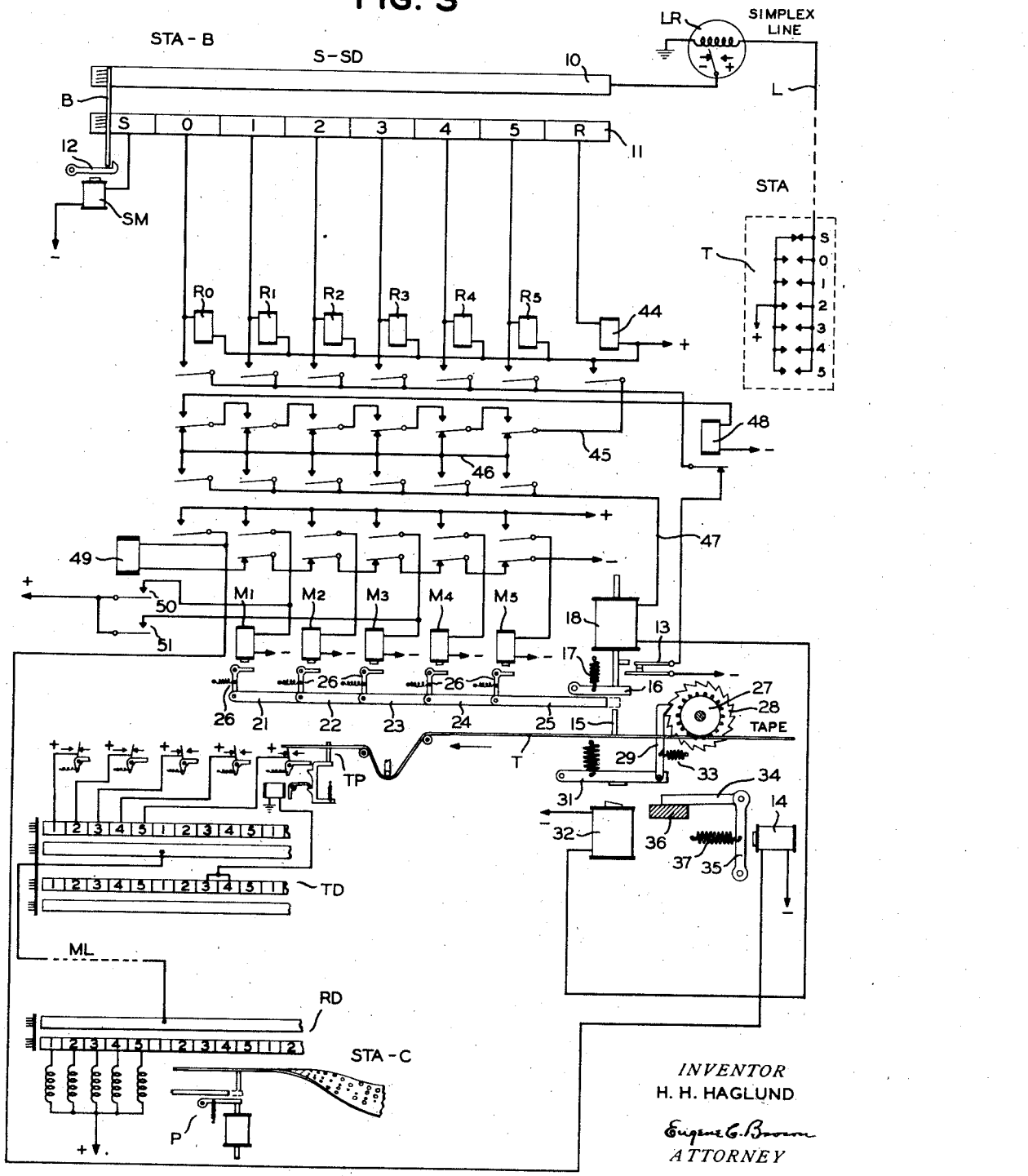
Fig. 3 is a diagrammatic view of a system including a receiving perforator arranged to respond to the six-unit code of Fig. 1 to produce a five-unit tape perforated in accordance with the code shown in Figure 2.

Referring to Figure 1 it will be noted that in the six-unit code proposed for controlling type casting machines, fifty-seven different combinations of six marking and spacing impulses are shown. The dots indicate the marking impulses of the code and the blank spaces indicate the spacing impulses. The sixth or additional impulse is shown in the right hand column and is labelled the 0 impulse. Combinations 54 and 55 are the upper case shift and lower case shift combinations respectively, and combination 56 is a blank which is not used. Consequently there are left fifty-four primary combinations obtainable. The shift combinations serve to operate and lock the receiving mechanism in either upper or lower case position, thereby enabling an additional fifty-four combinations to be obtained. It will be seen that combinations numbers 1 to 26, corresponding to the letters of the alphabet, and 51 to 56 all employ a spacing condition in the sixth or 0 unit position. Consequently all of these selections may be correctly transmitted as regular five-unit code. The remaining combinations numbers 27 to 50 and 57 employ a marking impulse in the right hand or zero column. These combinations are represented in the five-unit code by transmitting the impulses in positions 1 to 5 as regular five-unit code either preceded or followed by a special five-unit code combination in place of the zero-unit of the code. In the code proposed, the only combination available for this purpose is the blank. Consequently in the present embodiment I have shown this special code combination as consisting of five spacing conditions following the transmission of impulses 1 to 5. The corresponding five-unit code is shown in Figure 2 and it will be observed that the marking and spacing impulses in columns 1 to 5 correspond to those in the similarly numbered columns of Figure 1, and that each code combination of the six-unit code having a marking condition in the zero column is followed, in the five-unit code, by a blank or all spacing combination.

It will be assumed for the purpose of this specification that the information to be transmitted to a remote point originates in a subscriber's office equipped with regular six-unit perforating and transmitted equipment. The six-unit tape produced by the subscriber may thus be employed either for operating a local type casting machine, for transmission to a remote type casting machine over a simplex circuit, or in accordance with the present invention it may be translated into a five unit code and transmitted over a regular multiplex channel.

By way of a specific example, it may be assumed that information recorded in the six-unit code on a tape at a subscriber's office in New York is to be used for controlling a type casting machine in a subscriber's office in Chicago. The six unit code may be transmitted over a simplex circuit from the New York subscriber to a central telegraph office in New York, translated at that point into a five-unit code and sent over a multiplex channel to a central telegraph office in Chicago where it is again transposed into the original six unit code and transmitted over a simplex circuit to the receiving subscriber.

The mechanism at the central office in New York for translating the six unit signals into a five unit perforated tape is shown in Figure 3. The signals transmitted by the subscriber at station A, by means of the transmitter T, are composed of six unit code and are received over the simplex line L on a line relay LR at the central telegraph office at station B from which they are repeated to a start-stop distributor S—SD having a solid ring 10 connected to the tongue of the relay LR, and a segmented ring 11 having eight segments, namely, a start segment S, six code segments numbered 0, 1, 2, 3, 4, 5, and a rest segment R. The brush B is normally held on the start segment S by a latch 12 controlled by the start magnet SM having one of its terminals connected to the start segment and the other to negative battery.

In the start-stop system of synchronizing the first or start impulse is of spacing character, which in the present instance is assumed to be positive battery. Consequently upon receipt of this impulse magnet SM is energized, releasing the brushes B which pass over the code segments as the corresponding selecting impulses are received. The final or rest impulse is of marking or negative battery and is received as the brush passes over the rest segment R.

The code segments 0 to 5 are connected through the windings of a group of selecting relays R0 to R5 to positive battery. Consequently as any combination is received it operates the selecting relays in accordance with the code. Relay R0 is provided with four contacts and the remaining relays with five contacts. Each of the selecting relays when operated is locked up over its first or upper tongue and front contact and the normally closed contacts 13.

The fourth or lowermost contact of relay R0 controls a double stepping magnet 14 the purpose of which will presently appear and the corresponding or fourth contacts of the remaining selecting relays R1 to R5 control a set of five selecting magnets M1 to M5 of a five unit receiving perforator. The perforating mechanism in addition to the magnets M1 to M5 has a set of five punch pins, one only of which is shown at 15, disposed immediately above the tape T. The pins are actuated by a punch hammer 16 normally held away from the punch pins by a spring 17 and forced towards the pins by the plunger of a solenoid 18. The interponent bars 21, 22, 23, 24 and 25 are actuated by the magnets M1 to M5 respectively through individual bell crank armatures 26. The tape is advanced in the direction of the arrow past the pins 15 by a star wheel 27 having rigid on its shaft a ratchet wheel 28. The ratchet wheel is engaged by a feed pawl 29 carried by the free end of the pivoted armature 31 of a tape stepping magnet 32. It is held in contact with the ratchet wheel by a spring 33. The feed pawl is arranged to move the tape through either one or two steps depending upon whether the magnet 14 is deenergized or energized. For this purpose a movable abutment 34 is pivotally mounted on the upper end of the armature 35 of the double stepping magnet 14. The free end of the abutment 34 is normally held interposed between the end of the armature 31 and a fixed stop 36, by a spring 37. Accordingly, the feed pawl can be moved downwardly the distance of only one tooth each time the stepping magnet 32 operates. The tape feed occurs on the back stroke of the armature 31.

However, in case the magnet 14 is energized preceding the stepping stroke, the abutment 34 is withdrawn from beneath the armature 31, thereby permitting the pawl 29 to make a complete stroke over two teeth of the ratchet.

Assume a code combination to be received over the line L representing a letter character, as the letter "a". This combination employs a spacing impulse in the 0 position, pulses 1 and 2 being marking. Consequently in such a combination the 0 impulse may be ignored and the code transmitted as a regular five unit signal. As the brush B passes over segments 0 to 5, relays R1 and R2 will be energized and locked up over their upper tongues and the contact 13. The remaining relays R0, R3, R4 and R5 remain deenergized. Consequently selecting magnets M1 and M2 are operated and the double stepping magnet 14 and selecting magnets M3, M4 and M5 remain unoperated. Interponent bars 21 and 22 will be inserted between the punch hammer and the corresponding punch pins. As the brush B passes on on to the rest segment R a circuit is established from the negative or marking contact of the line relay LR through a magnet 44, closing its contact and completing a circuit from positive battery through this contact, conductor 45, the second tongue and lower contact of relay R5, conductor 46, third tongue and upper contacts in parallel of relays R1 and R2 and thence by conductor 47 through the punch solenoid 18 and stepping magnet 32, in series. The solenoid 18 forces the selected punch pins through the tape and at the lower end of its stroke opens contacts 13 interrupting the locking circuits for the selected relays R0 to R5. The purpose of the second and third contacts of the relays R0 to R5 will presently appear.

As previously explained, since this particular six unit combination employs spacing battery for the 0 impulse, the corresponding five unit code is not followed by the special blank code combination. Consequently, it is necessary to step the tape with a single space following the perforating. Relay R0 being unoperated by the received combination, the magnet 14 remains unenergized and the stepping pawl 29 is permitted to make but a single step due to the interference of the abutment 34 with the stroke of the magnet 32.

If the next combination is a figure or other character signal having the 0 pulse of marking polarity, such as numeral 9 in which the 0, 1, 3, 4 and 5 pulses are marking, it is necessary in order to distinguish this combination from the letter X (differing therefrom only in the first pulse) to transmit a special code permutation either preceding or following the transmission of the numbers 1 to 5 pulses. Since a blank or all spacing permutation has been selected for this purpose, it is only necessary to step the tape an additional space so as to leave a blank row following each combination which employs marking battery for the first impulse. In the present example relays R0, R1, R3, R4 and R5 all operate and lock up. Consequently, the fourth contact of each of these relays is raised, energizing the double stepping magnet 14 and the selecting magnets M1, M3, M4 and M5. The abutment 34 is withdrawn from beneath the armature 31 of the stepping magnet, by the magnet 14 and is held in such position until the relay R0 is released. The tape is perforated in accordance with the setting of the magnets M1 to M5 as the brush crosses the rest segment R and at the completion of the punching operation contact 13 is opened to unlock the relays R0 to R5. Due to the withdrawal of the abutment 34, the pawl 29, on the down stroke, is moved over two teeth of the ratchet wheel thereby causing the tape to be advanced two steps as the pawl is released. Consequently, the six unit signal is represented in the tape by one five unit permutation followed by a blank row. The design produced in the tape is shown in Figure 5 from which it will be noted that all of the letter characters are represented by a single row of perforations and the numeral characters by two rows, one of which is blank.

Since the rub-out combination is used only when an error has been made in the perforating of the six unit tape, it is a waste of line time to repeat these rub-out impulses over the multiplex line. Therefore, I have provided the second and third contacts of the relays R0 to R5 to delete the rub-out signals so that they do not appear in the five unit tape. From an inspection of the second contacts of each of these relays it will be noted that should all of the relays be operated (in response to a rub-out signal) all of these contacts will be away from their lower or back stops thereby interrupting the circuit to the punch magnet 18 and the stepping magnet 32. Consequently the rub-out signal will not be recorded. The rub-out combination, however, is locked up in the relays R0 to R5 and since the contact 13 is not opened at this time, due to the inaction of the punch solenoid, it is necessary to provide an auxiliary interrupter for the relay locking circuits. For this purpose the locking circuit includes the tongue and back contact of an unlocking relay 48. The winding of the relay 48 has one terminal connected to negative battery and the other terminal connected to the front contact of the second tongue of relay R0. Consequently with all of the relays operated, and, therefore, all of the second tongues on their upper contacts a circuit is completed for the relay 48 from positive battery through the contacts of control relay 44, as the rest segment R is crossed. The operation of relay 44 thus interrupts the locking circuits of the relays R0 to R5 whenever a rub-out signal is received but at no other time. Whenever any impulse of the received combination is spacing, which must occur except for the rub-out signal, the circuit through the contacts of relay 44 will be completed to the punch magnet 18 and stepping magnet 32 by virtue of the second tongue of at least one of the selecting relays resting upon its lower contact and the third tongue of at least one of the relays being drawn up against its upper contact.

Another combination occurring with frequency in the transmitted six unit code and which performs no useful function, except to space out blank tape at the keyboard perforator, is the blank combination. It is desirable to eliminate the blanks from the multiplex tape in order to save line time over the multiplex circuit, and to avoid improper operation of the receiving multiplex perforator due to the occurrence of such a blank following as character code combination. The blanks transmitted from the subscribers station A, are eliminated at the contacts of the selecting relays R1 to R5. Since this combination consists of six spacing impulses none of the relays are operated. Consequently all tongues remain down and the circuit for operating the perforating magnet 18 and tape stepping magnet 32 are uncompleted, as the distributor completes its revolution.

In the arrangement so far described there is one possible signal condition which may be improperly translated. Referring to Figure 1 it will be seen that in the six unit code the combination representing the "em space" is a single marking pulse in the 0 column. Accordingly such a signal would be recorded on the five unit tape as two rows of blanks. These two rows of blanks may be properly translated into the six unit code at the distant end of the multiplex line by the provision of some mechanism for distinguishing the first blank of such a double blank combination from a blank which determines the polarity of the 0 pulse in the combinations used for figures and punctuation marks. However, there are a number of possible six unit permutations not used in the six unit code in which one or more of the impulses in positions 1 to 5 are marking and I prefer to substitute, at the reperforator, one of these in place of the "em space" combination. By way of example, a combination having the 0, 1 and 3 impulses marking may be used. This combination will then appear in the five unit tape as one row having pulses 1 and 3 marking followed by a blank row representing the 0 pulse as marking.

For this purpose each of the relays R1 to R5 has been provided with a fifth (lowermost) contact. These contacts and their back stops are arranged serially as shown and in circuit with one terminal of the winding of a relay 49, the opposite terminal of which is connected to the fourth tongue of relay R0. Consequently, whenever the "em space" code is received the fourth or lower contact of relay R0 closes against its upper stop and the lower tongues of relays R1 to R5 remain against their lower or back contacts thereby completing a circuit to the relay 49. The relay 49 controls two contacts 50 and 51, the former of which is connected to the winding of the selecting magnet M1 and the latter to the winding of selecting magnet M3. Therefore, whenever the "em space" combination is received, the contacts 50 and 51 are closed to effect the operation of magnets M1 and M3 thereby perforating the tape correspondingly. Relay 14 is operated this time since the zero pulse is marking, causing the tape to double space and producing a blank following this combination. It is to be understood that at the distant station this substitute combination must be retransposed into the original six unit combination used for "em space".

It will be noted that by using two five unit permutators for certain characters and a single five unit permutator for other characters, I have produced a code enabling a hundred or more selections to be obtained with a basic five unit code, whereby such selections may be transmitted over a standard multiplex channel or other telegraph system based on the five unit code. While the five unit code employs ten impulses for certain characters as against six impulses of the six unit code, it uses only five impulses for other combinations. Since the majority of characters are letters which require only five units, the total number of line impulses used with the five unit code proposed is materially less than the number required with the six unit code. The elimination of the "rub out" combination in the five unit code further decreases the number of impulses which must be transmitted over the multiplex circuit. The saving in line time by the conversion of signals into the five unit code may be from 10 to 20 percent or more.

The tape so perforated in five units may pass directly to a tape transmitter, diagrammatically illustrated as comprising the group of five transmitting pins TP (one only of which is shown) controlling contacts C by which the code is set upon the segments of a multiplex transmitting distributor TD for transmission over the main line ML to a distant central telegraph office at station C, at which point it is received on the usual multiplex receiving distributor RD and distributor to a regular five unit perforator P.

At the distant end of the multiplex circuit it is necessary to reconvert the five unit code into the original six unit code for transmission to the receiving subscriber over his simplex circuit. The apparatus for effecting this translation is shown in Figure 4.

Assume a five unit tape to be produced at the distant end of the multiplex circuit, from which it is desired to reconvert the signals into a six unit code. The tape is passed through a tape transmitter diagrammatically illustrated as having two rows of pins 52 and 53, each row comprising five pins. The transmission is controlled primarily from the foremost row 52, the second row determining (from the presence or absence of a blank in the tape following each combination) whether the 0 pulse is to be of marking or spacing polarity. The tape T is drawn over the pins by a star wheel 54 actuated by a ratchet wheel 55 and a feed pawl 56. The pawl 56 is carried by the upper end of a push rod 57 adapted to be elevated by a lever 58 pivoted between its ends and actuated by the armature 59 of a stepping magnet 61. The pawl is drawn downward by a spring 62 secured to the push rod 57. The pawl is adapted to step the tape either one or two spaces depending upon the stroke of the armature 59 which is controlled by the position of the armature 60 of a double stepping magnet 63. The stepping magnet 61 also served to withdraw the pins 52, 53 from the tape, through a T-shaped member 64, engaging the inturned ends 65 of the pin carriers 66 and 67. The pins are urged towards the tape by springs 68. Each of the five pin carriers 66 is provided with two contacts 71 and 72. The upper contact works between a spacing or positive bus bar S and a marking or negative bus bar M. These contacts are connected to the segments 1 to 5 of the transmitting ring 73 of a start-stop transmitting distributor S—STD. The purpose of the lower set of contacts 72 will presently appear.

The pin carriers 67 have a single contact 70 arranged to be closed to its positive side whenever any one of the pins rise. If all pins are held depressed by a blank occurring in the tape, the contact 70 remains at its negative side. This contact is connected to the 0 segment of ring 73. This ring also has a start segment S of positive polarity and a rest segment R of negative polarity.

The solid ring 74 is connected to the winding of a relay 75 by which the six unit signals are repeated over the simplex line L1. Rings 73 and 74 are traversed by brushes B1. The transmitting distributor also has a local ring 76 connected to positive battery and a segmented local ring 77. Rings 76 and 77 are traversed by brushes B2. The segment numbered 8 of ring 77 is connected by a conductor 78 to the stepping magnet 61 and thence to negative battery.

Assume the tape to be passing through the transmitter and that the character combination engaged at the instant by the pins 52 to be a letter, that is to say, a combination which is not followed by a blank in the tape. One or more pins of both rows 52 and 53 will be raised through the perforations into the position shown in Figure 3. Such combination will have in the six unit code, a spacing impulse in the zero position. With at least one of the pin carriers 67 raised, contact 70 will be closed on its positive side applying positive or spacing battery to the zero segment of ring 73. Contacts 71a to 71e will be closed against either their marking or spacing bus bars according to the arrangement of the perforations of the portion of the tape engaged by the pins 52 and a corresponding code combination will be set up on the segments 1 to 5. The brushes B1 and B2 rotate continuously and transmit the impulses set up on the ring 73 through the relay 75 to the line L1 and thence to the typesetting equipment TS at the receiving subscriber's station D. At the time brush B2 engages segment 8 of ring 77 a circuit is completed for the stepping magnet 61 over the conductor 78, causing the same to withdraw the pins 52 and 53 from the tape and on continued movement of the armature 59 to advance the feed wheel 54. Since contact 70 is on its positive side, the tongue of the polar relay 79, in circuit therewith, rests on its positive side. Therefore, the double spacing magnet 63 is not operated and the feed pawl is limited to a single step. This position of the contact 70 is shown in Figure 6.

If the next character in the tape is a figure character in which the zero impulse is marking in the six unit code, blank tape will be disposed immediately above the pins 53. Consequently, all of these pins will be held depressed and switch 70 retained on its negative side, thereby applying negative or marking battery to the zero segment and at the same time operating the relay 79 to its negative side and thereby energizing magnet 63 to withdraw the movable abutment 60 from beneath the lever 58 so as to permit this lever to make a full stroke and advance the tape two steps as the brush B2 reaches the end of its revolution. The blank tape will thus be moved completely past the pins 52 and the succeeding character will be placed above these pins.

It will be noted that the circuit for the relay 79 is completed through contacts 81, opened by the armature 59 of the stepping magnet as it starts its stroke. The withdrawal of the pins 53 causes the contact 70 to move to its negative side each time, but the interruption of the circuit at contacts 81 prevents the operation of the relay at this time. It, therefore, remains in the position in which it was placed before the pins were withdrawn.

It will be recalled that the "em space" combination, consisting of a zero marking impulse and impulses 1 to 5 spacing was converted by the tape reperforator shown in Figure 2 into a combination in which the 1 and 3 impulses were marking. It is necessary, at the transmitter, to reconvert this combination back to its original six unit form. For this purpose, contacts 72a to 72e are provided. These contacts are so wired that whenever the 1 and 3 impulses only are marking and blank tape appears above the pins 53, a circuit will be completed from the negative side of contact 70, conductor 82, contact 72a to 72e in series, to relay 83 and thence to positive battery. The relay 83 when thus operated removes the negative battery from the marking bus bars and substitutes positive or spacing battery therefor. Hence with negative or marking battery on the zero segment and positive or spacing battery on the remaining code segments, the combination transmitted over the line L1 will correspond to the original six unit combination of zero marking and impulses 1 to 5 spacing.

From the foregoing, it will be observed that signals originating in the six unit code at a subscriber's office are converted into a five unit code at the central telegraph office, the "rub out" signals deleted therefrom, objectionable combinations replaced by those better suited to the proposed multiplex code and the entire range of selections transmitted over a five unit multiplex circuit. At the distant end of the multiplex circuit the signals are reconverted into the original six unit code and transmitted to the receiving subscriber.

Obviously, the invention is not limited to the transmission of signals between a five and six unit code, but may be employed where the code has either a large or smaller number of units. Moreover, many changes and modifications may be made in the system and apparatus disclosed without departing from the essential attributes of the invention. Therefore, I do not desire to be limited to the particular details shown and described but contemplate all obvious variations thereof as coming within the scope of the appended claims.

What I claim is:

1. The method of transposing telegraph signals from a code having a definite number of selecting conditions arranged in predetermined order, into a code having a lesser number of units, comprising utilizing all but one of said selecting conditions in the order of their occurrence in the first code and indicating the nature of said omitted selecting condition by the absence or presence of an accompanying combination of selecting conditions.

2. The method of transposing telegraph signals from a code having a definite number of selecting condition into a code having a different number of units comprising representing certain of the character combinations of said first code by combinations of the second code having a lesser number of selecting conditions and representing the remaining character combinations of the first code by a plurality of combinations of said second code, occurring in succession.

3. The method of transposing telegraph signals from a code having a definite number of selecting conditions into a code having a lesser number of units, comprising utilizing a predetermined number, less than all, of said selecting conditions in the order of their occurrence in the first code and indicating the nature of the omitted selecting conditions by the absence or presence of an accompanying combination of selecting conditions.

4. The method of translating telegraph signals from a six unit code into a five unit code comprising transmitting selecting conditions corresponding to five units of the six unit code in the order of their occurrence and either preceding or following said combination with a second five unit combination whenever the six unit of the first code is of a marking character.

5. The method of translating telegraph signals from a six unit code into a five unit code comprising transmitting selecting conditions corresponding to five units of the six unit code in the order of their occurrence and either preceding or following said combination with a second five unit combination consisting entirely of spacing conditions whenever the sixth unit of said first code is of a predetermined nature.

6. The method of producing a tape perforated in five units in response to received six unit permutation signals comprising perforated tape in a transverse row in accordance with five of the units of said unit code and advancing the tape through two character spaces when the sixth unit is of a predetermined nature, whereby said perforated row is either preceded or followed by an imperforate row.

7. The method of producing a tape perforated in a predetermined number of units from signals having a large number of impulse units comprising perforating the tape in accordance with the nature of a definite number of impulses of the larger code and translating the remaining impulses of the said larger code into tape spacing operations.

8. The method of producing a perforated tape corresponding to a permutation code comprising perforating said tape in accordance with the conditions of all but one unit of each character permutation and spacing the tape either one or two spaces past the perforating position depending upon the nature of the remaining unit of the character permutation.

9. The method of producing a perforated tape corresponding to a permutation code comprising perforating said tape in a transverse row in accordance with the nature of all but one unit of each character permutation and, when said remaining unit is of a predetermined nature, conditioning either a preceding or following transverse row of the tape in accordance with the nature of said remaining unit.

10. The method of controlling a tape perforator from a permutation code signal comprising utilizing one unit of said code signal to determine the longitudinal spacing of a tranverse row of perforations in the tape and utilizing the remaining units to determine the arrangement of the perforations in said row.

11. In a telegraph system, a source of permutation code signals having a predetermined number of impulse units, a perforator having a plurality of perforating elements less in number than the number of units in said code, means for feeding the tape through said perforator, means for perforating said tape in accordance with all but one unit of each code permutation and means for variably feeding the tape past the perforating position in accordance with the nature of said remaining unit.

12. In a telegraph system, a source of permutation code signals having a predetermined number of impulse units, a perforator having a plurality of perforating elements less in number than the number of units in said code, means for perforating said tape in a transverse row in accordance with all but one of the units of said code, and means for conditioning an adjacent transverse row of said tape in a predetermined manner when said remaining unit is of a predetermined nature.

13. The method of transposing telegraph signals from a code having a definite number of impulses for each character into a code having a different number of impulses comprising transmitting certain of the character combinations of the first code by a lesser number of impulses than that employed in the first code and transmitting the remainder of the character combinations of the first code by a greater number of impulses than that employed in the first code.

14. In a telegraph system, a source of permutation code signals having a uniform number of impulses, means responsive to said signals for eliminating pre-determined combinations therefrom and for transposing the remaining combinations into code signals composed of one or more groups of a lesser number of impulses.

15. In a code transposing apparatus, a storage mechanism having a plurality of storage members corresponding in number to a first code, means for operating said storage members selectively in accordance with the selecting conditions of said code, a tape perforator having a number of perforating elements less than the number of said storage members, a tape-stepping mechanism for said perforator and means responsive to the setting of a portion of said storage members for selecting pre-determined perforating elements for operation and means responsive to the setting of the remainder of said storage members for controlling said tape-stepping mechanism.

16. In a telegraph system, a source of permutation telegraph signals comprising character code groups each having a predetermined number of impulse units, means responsive to predetermined impulses of each character code group for transmitting said impulses in the order of their occurrence, and means responsive to the remaining impulse or impulses of each code group for transmitting a combination of impulses representative of but different from said remaining impulse or impulses.

17. In a telegraph system, a source of permutation telegraph signals comprising character code groups of impulses, each group having a predetermined number of impulse units, means responsive to predetermined impulses of each group for transmitting said impulses in the order of their occurrence, and means responsive to the remaining impulse or impulses, when of a certain nature, for transmitting a combination of impulses representative of but different from said remaining impulse or impulses.

18. In a telegraph system, a source of permutation telegraph signals comprising character code groups of impulses, each group having a uniform number of impulse units, a repeating mechanism for said signals, said mechanism having means for repeating certain impulses of each code group in the order of their reception and having means for inserting predetermined combinations of impulses differing from but representative of the remaining impulses of certain of said character code groups of signals.

19. In a telegraph system, a source of permutation telegraph signals comprising code groups of impulses, each group having a uniform number of units, means responsive to said signals for deleting certain ones thereof and for transposing others thereof into code signals composed of one or more groups of a lesser number of impulses, and means for transmitting said latter signals over a circuit.

20. In a telegraph system, a source of permutation telegraph signals comprising code groups of impulses, each group having a uniform number of impulses and including character code groups and rub-out signals, means responsive to said signals for deleting said rub-out signals and for transposing said character code groups of impulses into code signals comprising one or more groups of a lesser number of impulses, and means for transmitting said latter signals over a circuit.

21. In a telegraph system, a source of permutation telegraph signals comprising code groups of impulses, each group having a uniform number of impulses, and including all marking conditions, all spacing conditions, and combinations of marking and spacing conditions, repeating means for said signals, said means serving to delete said all marking and all spacing conditions and to transmit each of said groups of mixed marking and spacing conditions as one or more groups of a lesser number of impulses.

22. In a telegraph system, a source of permutation telegraph signals comprising code groups of impulses, each group having a uniform number of impulses and including all spacing conditions and combinations of marking and spacing conditions, repeating means for said signals, said means serving to delete signals composed of all spacing conditions and to transpose signals composed of mixed marking and spacing conditions into one or more groups of a lesser number of impulses.

23. In a telegraph system, a source of signals, means for perforating a tape in transverse rows in accordance with certain signals, with each character represented by one or more transverse rows of tape, a transmitter associated with the tape, said transmitter having means for determining whether each character is represented by one row of perforations or by a plurality of rows thereof and for transmitting a single code combination of a uniform number of impulses for each character irrespective of whether the character occupies one or more transverse rows of the tape.

24. In a telegraph system, a source of signals, means for perforating a tape in transverse rows in accordance with certain signals, with each character represented by one or more transverse rows of tape, a transmitter associated with the tape, said transmitter having a plurality of rows of tape engaging pins for determining whether each character is represented by one row of perforations or by a plurality of rows thereof and for transmitting a single code combination of a uniform number of impulses for each character irrespective of whether the character occupies one or more transverse rows of the tape.

25. In a telegraph system, a source of signals, means for perforating a tape in transverse rows in accordance with certain signals, with each character represented by one or more transverse rows of tape, a transmitter associated with the tape, said transmitter having a row of tape transmitting pins and a row of tape feeling pins, said latter row of pins serving to determine whether said character is represented by one row of perforations or by a plurality of rows, the pins of each row cooperating to transmit a single code combination of a uniform number of impulses for each character irrespective of whether the character occupies one or more transverse rows of the tape, and a tape feeding mechanism for the transmitter, said tape feeling pins controlling the operation of said tape feeding mechanism to advance the tape one row of perforations or a plurality of rows thereof.

26. In a telegraph system, a source of signals, means for perforating a tape in transverse rows in accordance with certain signals, with each character represented by one or more transverse rows of tape, a transmitter associated with the tape, said transmitter having a plurality of rows of tape engaging pins for determining whether said character is represented by one row of perforations or by a plurality of rows thereof, the pins of each row cooperating to transmit a single code combination of a uniform number of impulses for each character irrespective of whether the character occupies one or more transverse rows of the tape, and a tape feeding mechanism for the transmitter, one of said rows of pins controlling the operation of said tape feeding mechanism to advance the tape one row of perforations or a plurality of rows thereof.

27. In a telegraph system, a source of signals, means for perforating a tape in transverse rows in accordance with said signals, with the row of perforations representing certain characters spaced laterally of the tape differently from the perforations representing other characters, and a transmitter controlled by said tape for transmitting a character code group of impulses for each row of perforations, said latter combination of impulses being modified in accordance with the lateral spacing of the row of perforations.

28. In a telegraph system, a source of signals, means for perforating a tape in transverse rows in accordance with said signals, with the row of perforations representing certain characters spaced laterally of the tape differently from the perforations representing other characters, and a transmitter controlled by the transverse arrangement of the perforations of each row and the lateral spacing of each row, to transmit a character code group of impulses having a greater number of impulses than the number of possible perforations in each transverse row of the tape.

29. In a telegraph system, a source of signals, means for perforating a tape in transverse rows in accordance with said signals, with the row of perforations representing certain characters spaced laterally of the tape differently from the perforations representing other characters, and a transmitter controlled by the tape to transmit a series of impulses corresponding to the transverse perforations of each row and an additional impulse, the nature of which depends upon the lateral spacing of the row of perforations.

30. In a telegraph system, a source of signals, means for perforating a tape in transverse rows in accordance with said character signals, each character signal occupying one row of perforations, a row of perforations and a row of blank tape or two rows of blank tape and a tape transmitter controlled by said tape, said transmitter serving to transmit a single code combination of a uniform number of mixed marking and spacing conditions for each character represented in the tape.

HAKON H. HAGLUND.